(12) United States Patent
Hsiao

(10) Patent No.: US 7,114,512 B2
(45) Date of Patent: Oct. 3, 2006

(54) GAS SAFETY DEVICE

(76) Inventor: Jason Hsiao, 531, Pei-Shin St., Chia Yi City (TW)

( * ) Notice: Subject to any disclaimer, the term of this patent is extended or adjusted under 35 U.S.C. 154(b) by 288 days.

(21) Appl. No.: 10/799,602

(22) Filed: Mar. 15, 2004

(65) Prior Publication Data

US 2005/0199290 A1  Sep. 15, 2005

(51) Int. Cl.
*F16K 17/38* (2006.01)
*F16K 21/02* (2006.01)

(52) U.S. Cl. .................. 137/73; 137/460; 137/513.5; 137/539; 137/540

(58) Field of Classification Search .................. 137/71, 137/72, 75, 513.5, 517, 539, 539.5, 460, 137/73, 535, 540
See application file for complete search history.

(56) References Cited

U.S. PATENT DOCUMENTS

| | | | | |
|---|---|---|---|---|
| 1,151,230 A | * | 8/1915 | Wilson | 137/539 |
| 1,764,181 A | * | 6/1930 | Raetz et al. | 137/517 |
| 2,541,282 A | * | 2/1951 | Powers | 137/517 |
| 2,929,399 A | * | 3/1960 | Magowan, Jr. | 137/517 |
| 4,830,046 A | * | 5/1989 | Holt | 137/460 |
| 5,613,518 A | * | 3/1997 | Rakieski | 137/513.5 |
| 5,983,928 A | | 11/1999 | Hsiao | |
| 6,155,285 A | * | 12/2000 | Hsiao | 137/75 |
| 6,405,751 B1 | | 6/2002 | Hsiao | |
| 2004/0244842 A1 | * | 12/2004 | Clare, Jr. | 137/539 |

* cited by examiner

*Primary Examiner*—John Rivell
(74) *Attorney, Agent, or Firm*—Stites & Harbison PLLC; Marvin Petry

(57) ABSTRACT

A gas safety valve includes a main body having a longitudinal through-hole consisting of a first section, a second section, and a third section with different inner diameters. A ball and a restraining member are mounted in the first section. A spring is mounted in the second section, with an end of the spring protruding out of the second section for biasing the ball away from the second section. An outer sleeve is force-fitted in the third section of the main body. A hollow adjusting block is mounted in the outer sleeve and has an outer threading for threadedly engaging with an inner threading of the outer sleeve. The other end of the spring abuts against the adjusting block. Adjustment of a position of the hollow adjusting block in the outer sleeve changes a distance between the ball and the second section.

2 Claims, 3 Drawing Sheets

GAS SAFETY DEVICE

BACKGROUND OF THE INVENTION

1. Field of the Invention

The present invention relates to a gas safety device. In particular, the present invention relates to a gas safety device including a main body and a ball that can block a gas passageway defined by a longitudinal through-hole of the main body when excessive flow occurs, thereby preventing mass leakage.

2. Description of the Related Art

Pressure difference has already been utilized in gas safety devices for assuring safety use of gas. U.S. Pat. No. 5,983,928 discloses a gas safety valve comprising a valve body with a longitudinal through-hole for receiving a ball. The longitudinal through-hole of the gas safety valve comprises several sections of various inner diameters such that when mass leakage occurs, the ball is moved to compress a spring and to block the longitudinal through-hole as a result of a pressure difference between two sides of the ball. Such a structure can be applied to gas sources of different pressure by means of simply changing the spring. However, the elastic constant of springs cannot be always identical even if they are manufactured under the same condition and thus fail to meet the requirement of precision. Namely, the ball might be incapable of blocking the longitudinal through-hole of the valve body, as the elastic constant of the spring is not within the predetermined operational range.

U.S. Pat. No. 6,405,751 discloses a gas safety valve comprising a main body, a valve seat, a restraining member, and an engaging member. The valve seat and the restraining member are threadedly engaged in the main body. The valve seat includes a valve block, a spring, and an adjusting element. When gas leakage occurs, the valve block blocks a longitudinal through-hole of the valve body, preventing mass leakage. Operation of the gas safety valve can be precisely achieved within a predetermined operational range. The structure of this gas safety valve is, however, complicated. When adjustment is required, the valve seat and the restraining member have to be troublesomely removed from the main body. And the valve seat and the restraining member have to be threadedly reengaged in the main body. As a result, the precision after adjustment may still has an error.

SUMMARY OF THE INVENTION

An object of the present invention is to provide a gas safety valve that has a simple structure to allow simple adjustment.

In accordance with an aspect of the present invention, a gas safety valve includes a main body, wherein a meltable element and an O-ring are mounted around the main body, and wherein an engaging member engages the main body to a coupler of a gas source. The main body includes a longitudinal through-hole having a first section, a second section, and a third section. Inner diameters of the first section, the second section, and the third section are different from one another. A ball and a restraining member are mounted in the first section. The ball has a diameter greater than the inner diameter of the second section, thereby restraining the ball and the restraining member in the first section. A spring is mounted in the second section and has a length greater than that of the second section, with an end of the spring protruding out of the second section for biasing the ball away from the second section.

An outer sleeve is force-fitted in the third section of the main body and has an inner threading. A hollow adjusting block is mounted in the outer sleeve and has an outer threading for threadedly engaging with the inner threading of the outer sleeve. The other end of the spring abuts against the adjusting block. Adjustment of a position of the hollow adjusting block in the outer sleeve changes a distance between the ball and the second section.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
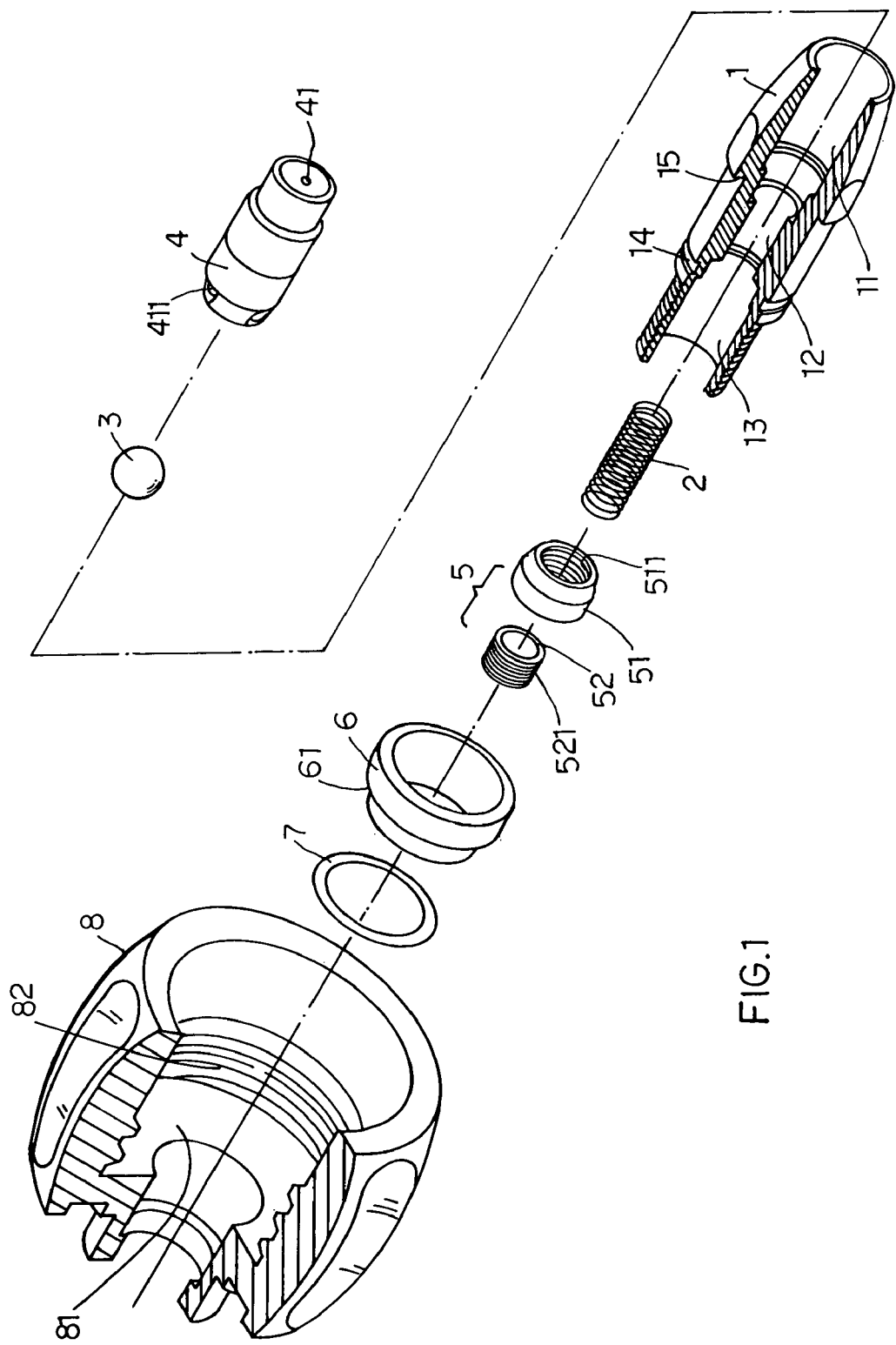
FIG. 1 is an exploded perspective view of a gas safety valve in accordance with the present invention.
Figure 2:
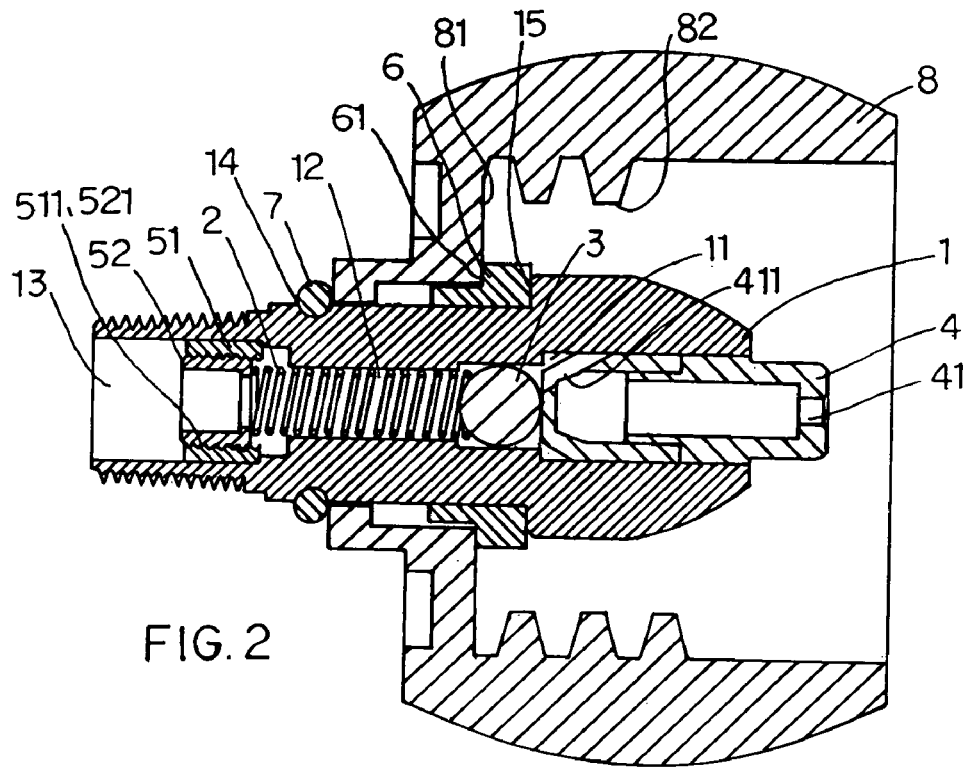
FIG. 2 is a sectional view of the gas safety valve in accordance with the present invention in a normal state.

Referring to FIGS. 1 and 2, a gas safety valve in accordance with the present invention generally comprises a main body 1 including a longitudinal through-hole that defines a gas passageway. The longitudinal through-hole includes a first section 11, a second section 12, and a third section 13, wherein inner diameters of the first section 11, the second section 12, and the third section 13 are different from one another. A ball 3 and a restraining member 4 are received in the first section 11, wherein the ball 3 has a diameter greater than the inner diameter of the second section 12. Thus, the ball 3 and the restraining member 4 are restrained to move in the first section 11 without the risk of falling out of the first section 11. The restraining member 4 comprises a longitudinal through-hole 41 including an inlet end communicated with a gas source (not shown) and an outlet end having an outlet hole 411 communicated with the second section 12.

A spring 2 is mounted in the second section 12 and has a length larger than that of the second section 12 such that an end of the spring 2 protrudes out of the second section and biases the ball 3 away from the second section 12 when in a normal operation state for supplying gas from the gas source to, e.g. a gas stove. In the normal operation state, no gas leakage occurs, and a pressure difference between two sides of the ball 3 is too small to move the ball 3 toward the second section 12 to a position blocking the gas passageway. The other end of the spring 2 abuts against a hollow adjusting block 52 of an adjusting member 5 mounted in the third section 13.

The adjusting member 5 includes an outer sleeve 51 force-fitted in the third section 13 and an hollow adjusting block 52 having an outer threading 521 threadedly engaged with an inner threading 511 of the outer sleeve 51. Thus, gas from the gas source pass through the hollow adjusting block 52 to the gas stove. An annular groove 14 is provided on an outer periphery of the main body 1. An O-ring 7 is mounted in the annular groove 14 to provide a sealing effect. Also formed on the outer periphery of the main body 1 is a stop 15 for limiting a meltable element 6 that is mounted around the main body 1, which is conventional and therefore not described in detail.

The main body 1 is connected to a coupler (not shown) of the gas source (not shown) by an engaging member 8. The main body 1 is mounted in the engaging member 8, with a stop 61 of the meltable element 6 abutting against a side of a restraining end 81 of the engaging member 8 and with an inner threading 82 of the engaging member 8 threadedly engaged with the coupler of the gas source.

Figure 3:
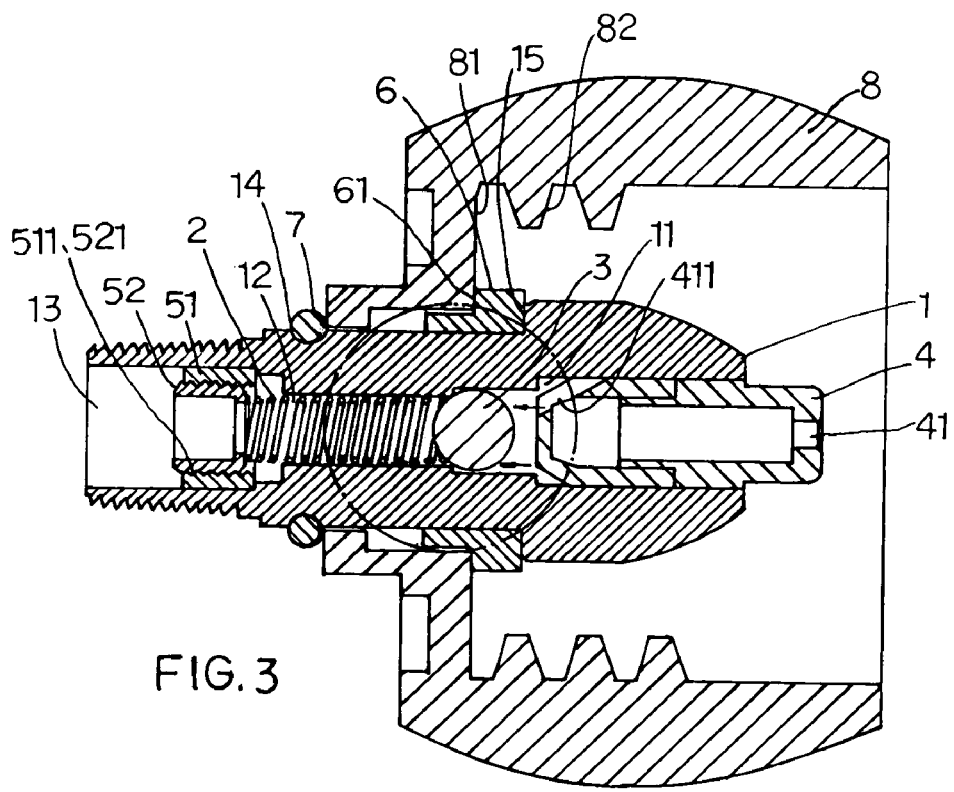
FIG. 3 is a sectional view similar to FIG. 2, wherein the gas safety valve in an excessive flow state.

Referring to FIG. 3, when excessive flow of gas occurs (i.e., mass gas leakage occurs between the gas stove and the main body 1), a large pressure difference exists between two side of the ball 3 such that the ball 3 is pushed toward the second section 12 and overcomes the spring 2. Thus, the end of the spring 2 retreats into the second section 12 and the ball 3 partially protrudes into and thus blocks an end of the second section 12. Namely, the gas passageway of the main body 1 is blocked, preventing mass gas leakage.

Figure 5:
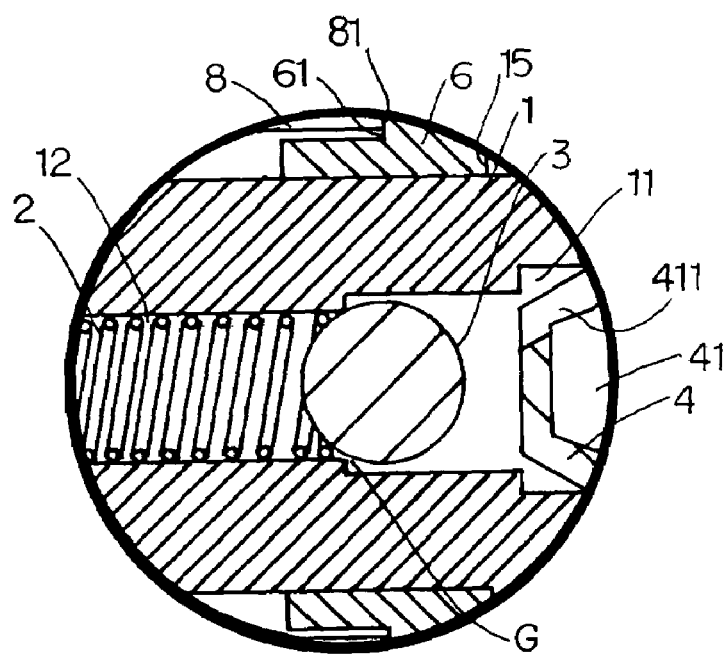
FIG. 5 is an enlarged view of a circled portion in FIG. 3

Referring to FIG. 5, in a case that the excessive flow problem is solved, e.g., a leaking hole is patched or a disengaged pipe is re-connected, and that the gas stove is still in a closed state to stop outflow of gas, the ball 3 still partially protrudes into the end of the second section 12. Since no leakage-preventing means is provided between the ball 3 and the end of the second section 12, minor amount of gas from the gas source passes through a small gap G between the ball 3 and the end of the second section 12. Thus, the pressure difference between two sides of the ball 3 gradually decreases to an extent not sufficient to compress the spring 2. As a result, the spring 2 pushes the ball 3 away from the second section 12 to the normal operational state.

As apparent from the foregoing, when excessive gas flow occurs, the ball 3 compresses the spring 2 and blocks the second section 12 by the pressure difference between two sides of the ball 3, preventing mass gas leakage. When the excessive gas flow problem is solved, the ball 3 no longer blocks the second section 12 and thus provides a clear passageway for gas.

As for the spring 2, as in the conventional design, the elastic constant of springs cannot be always identical even if they are manufactured under the same condition and thus fail to meet the requirement of precision. Namely, the ball might be incapable of blocking the gas passageway, as the elastic constant of the spring is not within the predetermined operational range.

Figure 4:
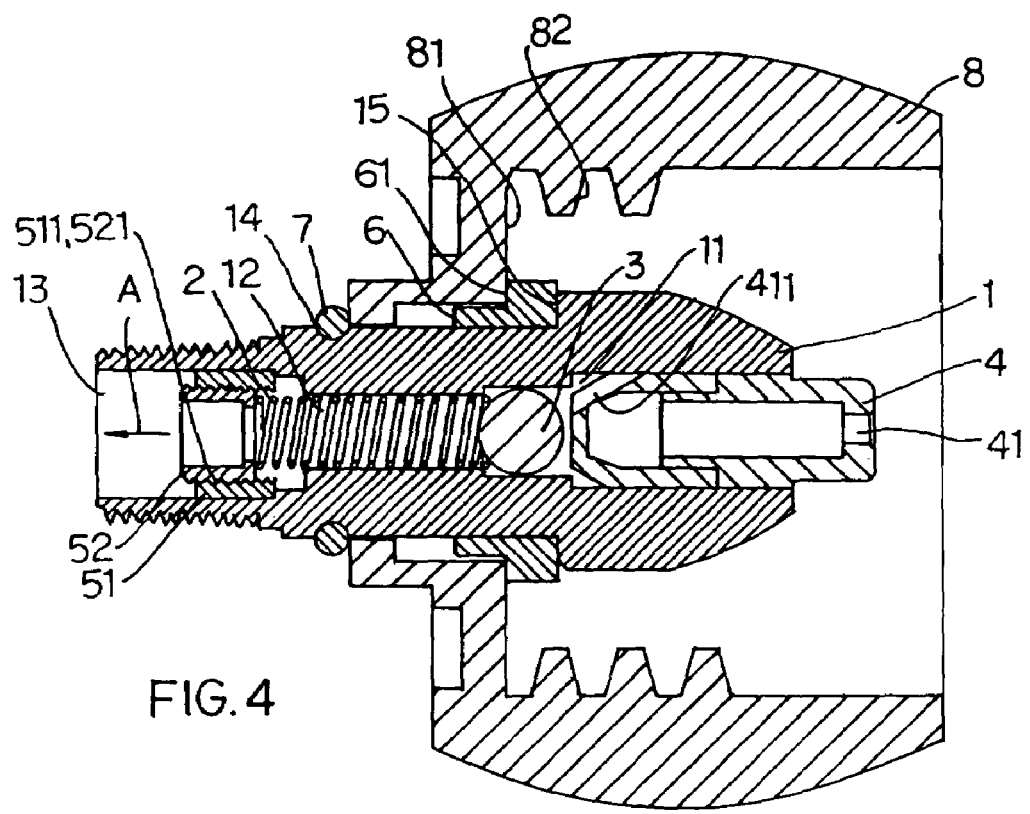
FIG. 4 is a sectional view similar to FIG. 3, illustrating adjustment of an adjusting element of the gas safety valve.

The compressed amount of the spring 2 is in proportion to the pressure of the gas from the gas source. Namely, the larger the gas pressure, the longer distance the ball 3 is moved. In a case that the gas safety valve is not within the predetermined operational range such that the ball 3 fails to block the gas passageway (e.g., the pressure difference between two sides of the ball 3 is too small to move the ball 3 to a position blocking the second section 12), referring to FIG. 4, a tool (not shown) is used to turn the adjusting block 52 toward the gas stove in a direction indicated by an arrow A such that the distance between the ball 3 and the second passage 12 becomes smaller. Thus, the smaller pressure difference between two sides of the ball 3 is now sufficient to move the ball 3 to the position blocking the second section 12, preventing mass gas leakage. On the other hand, when the adjusting block 52 is moved away from the gas stove, moving the ball 3 to block the second section 12 requires s larger pressure difference between two sides of the ball 3. Thus, by means of adjusting the position of the adjusting block 52, the distance between the ball 3 and the second section 12 is changed. The ball 3 may thus block the gas passageway to prevent mass gas leakage in the predetermined operational range. The product quality is uniform and meets the quality control standard.

Although the invention has been explained in relation to its preferred embodiment, it is to be understood that many other possible modifications and variations can be made without departing from the scope of the invention as hereinafter claimed.

What is claimed is:

1. A gas safety valve comprising a main body, a meltable element and an O-ring being mounted around the main body, and an engaging member for engaging the main body to a coupler of a gas source, the main body comprising a longitudinal through-hole including a first section, a second section, and a third section, inner diameters of the first section, the second section, and the third section being different from one another, a ball and a restraining member being mounted in the first section, the ball having a diameter greater than the inner diameter of the second section, thereby restraining the ball and the restraining member in the first section, a spring being mounted in the second section and having a length greater than that of the second section, with an end of the spring protruding out of the second section for biasing the ball away from the second section, the improvements comprising:

an outer sleeve being force-fitted in the third section of the main body, the outer sleeve including an inner threading, a hollow adjusting block being mounted in the outer sleeve and having an outer threading for threadedly engaging with the inner threading of the outer sleeve, the spring having another end abutting against the adjusting block;

wherein adjustment of a position of the hollow adjusting block in the outer sleeve changes a distance between the ball and the second section.

2. The gas safety valve of claim 1, wherein the outer sleeve is force-fitted in the third section in a non-threaded engagement.

* * * * *